United States Patent
Lu et al.

(10) Patent No.: US 9,148,857 B2
(45) Date of Patent: Sep. 29, 2015

(54) COMMUNICATION METHOD AND COMMUNICATION TERMINAL UNDER DISCONTINUOUS RECEPTION MODE

(71) Applicant: FUJITSU LIMITED, Kawasaki-shi, Kanagawa (JP)

(72) Inventors: Yanling Lu, Beijing (CN); Yoshiaki Ohta, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 13/717,034

(22) Filed: Dec. 17, 2012

(65) Prior Publication Data

US 2013/0107781 A1 May 2, 2013

Related U.S. Application Data

(63) Continuation of application No. PCT/CN2010/074054, filed on Jun. 18, 2010.

(51) Int. Cl.
*H04W 4/00* (2009.01)
*H04W 52/02* (2009.01)
*H04W 74/00* (2009.01)
*H04W 28/04* (2009.01)
*H04W 76/04* (2009.01)
*H04L 1/18* (2006.01)

(52) U.S. Cl.
CPC .......... *H04W 52/0258* (2013.01); *H04L 1/188* (2013.01); *H04W 52/0216* (2013.01); *H04W 74/008* (2013.01); *H04L 1/1803* (2013.01); *H04W 28/04* (2013.01); *H04W 76/048* (2013.01)

(58) Field of Classification Search
USPC .................................................. 370/311, 329
See application file for complete search history.

(56) References Cited

U.S. PATENT DOCUMENTS

2011/0310997 A1* 12/2011 Ke et al. ......................... 375/316
2015/0016402 A1* 1/2015 Wager et al. ................... 370/329

FOREIGN PATENT DOCUMENTS

| CN | 101296432 | 10/2008 | |
| CN | 101730207 | 6/2010 | |
| EP | 2152040 | 2/2010 | |
| WO | WO 2011156966 A1 * | 12/2011 | ............ H04W 52/00 |

OTHER PUBLICATIONS

Notification of the First Office Action issued for corresponding Chinese Patent Application No. 201080067478.6 dated Nov. 3, 2014 with an English translation.
International Search Report issued for corresponding International Patent Application No. PCT/CN2010/074054, mailed Mar. 31, 2011 with English translation.

* cited by examiner

*Primary Examiner* — Phuongchau Ba Nguyen
(74) *Attorney, Agent, or Firm* — Myers Wolin, LLC

(57) ABSTRACT

A communication method in a discontinuous reception mode of a mobile communication system and communication terminal having the discontinuous reception mode are disclosed in the present invention. The method comprises: performing, by a terminal, a contention based transmission; starting a first timer, wherein the terminal is kept active during the operation of the first timer; and stopping the first timer when a preset first condition is met.

16 Claims, 4 Drawing Sheets

COMMUNICATION METHOD AND COMMUNICATION TERMINAL UNDER DISCONTINUOUS RECEPTION MODE

CROSS-REFERENCE TO RELATED APPLICATIONS

The present application is a continuation of PCT Application No. PCT/CN2010/074054, filed on Jun. 18, 2010, the contents of which are herein wholly incorporated by reference.

FIELD OF THE INVENTION

The present application relates to a communication method and communication terminal and in particular to a communication method in a discontinuous reception mode of a mobile communication system and communication terminal having the discontinuous reception mode.

BACKGROUND OF THE INVENTION

In a mobile communication system, for saving power consumed by a mobile terminal, the terminal may stop receiving some signal from a base station serving the terminal, which is called as "discontinuous reception". If the terminal is in the discontinuous reception mode, a time period, during which the reception of the signal of the serving base station must be kept, is called "active time", the time period except for the active time is called "idle time". As shown in FIG. 1, the terminal does not receive some signal from the serving base station during the idle time. Of course, the terminal may perform other operations, such as measurement of a neighboring cell, during the idle time.

SUMMARY OF THE INVENTION

In power-saving mode, it should be ensured that the terminal does not miss any information which is sent to the terminal by the base station while saving power of the terminal. That is, the terminal is in the active state (i.e., in the active time) when the serving base station is sending the information to the terminal, while the active time needs to be reduced as much as possible. To this end, the terminal needs to consider all factors which might influence the active state.

One of the objects of the present invention is to provide a communication method in a discontinuous reception mode of a mobile communication system and communication terminal having the discontinuous reception mode so as to ensuring the operation of discontinuous reception mode.

According to one embodiment of the present invention, there is provided a communication method in a discontinuous reception mode of a mobile communication system, comprising: performing, by a terminal, a contention based transmission; starting a first timer, wherein the terminal is kept active during the operation of the first timer; and stopping the first timer when a preset first condition is met.

According to another embodiment of the present invention, there is provided a communication terminal having a discontinuous reception mode, comprising a transmitter, a receiver and a controller. The controller comprises a first timer, wherein the transmitter is configured to perform a contention based transmission; the first timer is configured to be started after the contention based transmission, and to be stopped when a preset first condition is met; and the controller is configured to keep the terminal active during the operation of the first timer.

It is ensured that the terminal can perform contention based transmission reliably in the discontinuous reception mode of the mobile communication system and the active time is reduced as much as possible by means of the method and terminal.

BRIEF DESCRIPTION OF THE DRAWINGS

The present invention will be more easily understood, with reference to the following description made in conjunction with the accompanying drawings. In some drawings, the same or similar components will be denoted by the same or similar reference numbers. The drawings together with the following detailed description are contained in the present specification and form a part of the present specification, and are adopted to further illustrate the preferred embodiments of the present invention and explain the principle and advantages of the present invention. In the drawings.

DETAILED DESCRIPTION OF THE EMBODIMENTS

Figure 1:
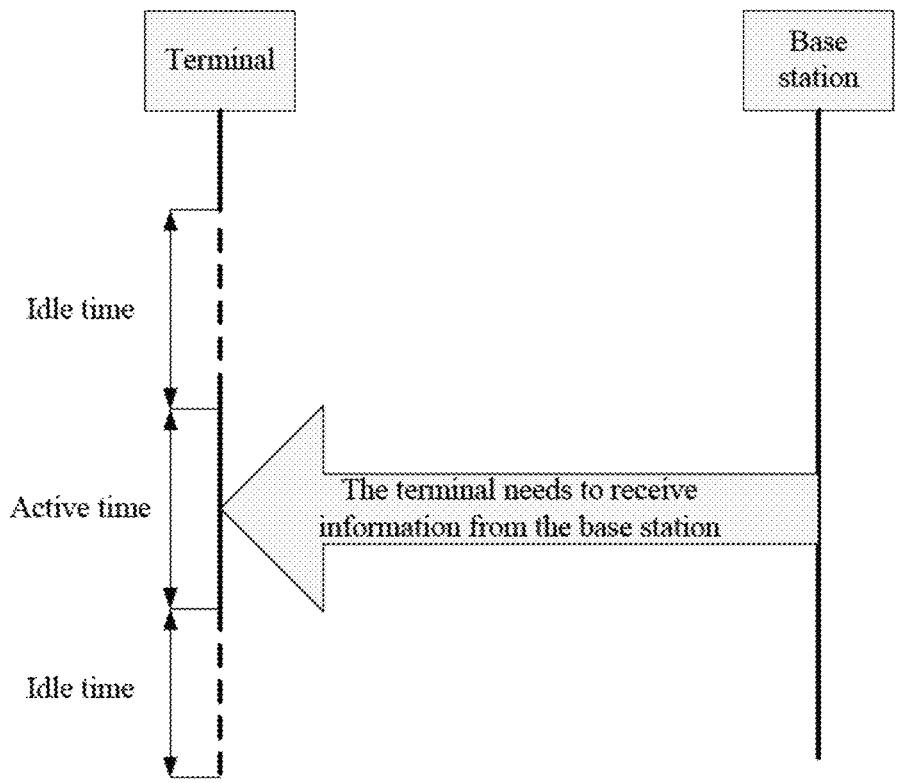
FIG. 1 illustrates a schematic view of a discontinuous reception mode of a mobile communication system.

Hereinafter, the exemplified embodiments of the present invention will be described in conjunction with the accompanying drawings. For clarity and conciseness, not all the features of the practical embodiments are described in the specification. However, it is to be understood that many embodiment-specific decisions needs to be made during the development of any of such practical embodiments, so as to achieve the specific object of the developer, and those decisions may vary with different embodiments. Further, it is also to be understood that the development work may be very complicated and time-consuming, but such development work is only a routine task for those skilled in the art who benefit from the present disclosure.

Further, it is to be noted that only the apparatus configurations closely related to the solution of the present invention are shown in the drawings, and other details less related to the present invention are omitted, so as to avoid the burring of the present invention due to unnecessary details.

As mentioned above, in the discontinuous reception mode of the mobile communication system, on the one hand, the communication terminal is kept in the idle time as much as possible for saving power, and on the other hand, the terminal is ensured not to miss information which is sent by the base station to the terminal. That is, there is a compromise between the efficiency and power saving.

In the fourth generation mobile communication system, many new techniques are involved for improving performance of the system. When the terminal is kept active, the terminal needs consider the influence of the new techniques. "Contention based scheduling" is a technique which influences the discontinuous reception mode.

So called contention based scheduling means that a system may dynamically allocate resources by allocating contention based uplink grant to a group of terminals via physical downlink control information. The uplink synchronized terminal in the group may perform uplink transmission by using resources, that may be allocated by the contention based uplink grant, in a manner of contention without transmitting a scheduling request in advance. The contention based radio network temporary identifier and other necessary preset parameters may be sent to the terminal via a system broadcast message or dedicated RRC signaling (radio resource control signaling). When the terminal does not have dedicated grant for the cell radio network temporary identifier of the terminal itself, the terminal may perform transmission in the contention based grant. Since the uplink grant is common resource, when the terminal transmits data in the contention based uplink grant, the cell radio network temporary identifier of the terminal needs to be included in the data to identify the identity of the terminal, such that the base station can identify which terminal transmits the data in the uplink grant. Meanwhile, the terminal may send a buffer state report in uplink grant, for informing the base station of the amount of data that needs to be transmitted in the uplink by the terminal, such that the base station allocates enough uplink grants to the terminal.

The inventor noticed that in the existing LTE-A ((Long Term Evolution Advanced) system, the influence of the contention based scheduling on the discontinuous reception mode is not considered thoroughly. Therefore, the present invention proposed an improved communication method and communication terminal in discontinuous reception mode according to the contention based scheduling.

First Embodiment

Figure 2:
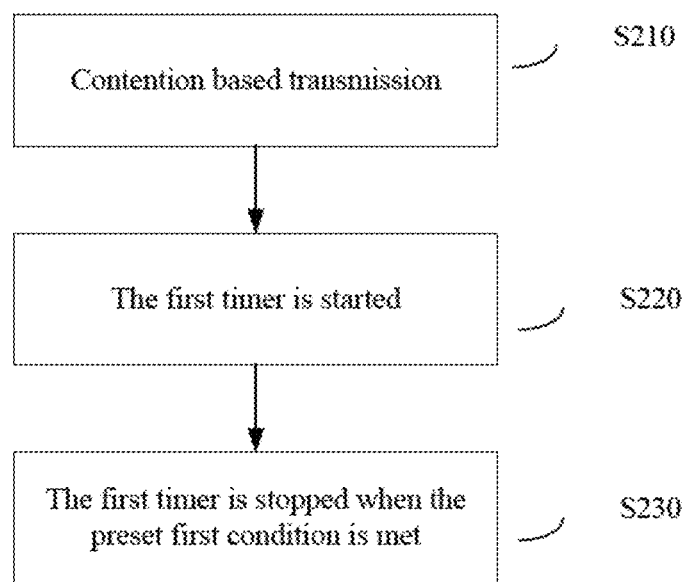
FIG. 2 illustrates a flow chart of a communication method in the discontinuous reception mode according to one embodiment of the present invention.

FIG. 2 is a flow chart of a communication method in the discontinuous reception mode according to one embodiment of the present invention. As discussed above, in the contention based scheduling, the base station at first allocates uplink grants to a group of terminals. As such, if a terminal has data which needs to be sent and there is no predefined dedicated uplink grant, the terminal performs contention based transmission in the uplink grants together with other terminals of the group in step S210. It should be noted that in the contention based transmission, the terminal may send only cell radio network temporary identifier of its own (and buffer state report if necessary) to identify its own identity and request the base station to allocate enough uplink grant to the terminal, or send a part or all of useful data (and buffer state report if necessary) in addition to the cell radio network temporary identifier, depending on available resources in the uplink grant. In addition, it should be noted that when the terminal has a predefined dedicated uplink grant, the terminal may perform the contention based transmission. For example, when the resources of the predefined dedicated uplink grant are not enough for the terminal, the terminal may strive for enough resources by contention based transmission. As can be seen, whether the terminal has a predefined dedicated uplink grant will not limit the solution of the present invention.

After performing the contention based transmission, the terminal starts a first timer in step S220, wherein the terminal is kept active during the operation of the first timer to wait for feedback from the base station to the terminal.

In step S230, the first timer is stopped when a preset first condition is met. After the contention based transmission is performed by the terminal, the uplink transmission information may be received successfully or unsuccessfully. Even in case of successful reception, the base station may determine whether a dedicated uplink grant is allocated to the terminal according to some factors which influence the allocation of the uplink grants. For example, the base station may make determination according to the report of buffer state report contained in the uplink transmission. Therefore, the first condition may includes the terminal receiving a dedicated uplink grant allocated by the base station or the terminal receiving acknowledgement information sent by the base station, or expiration of a predefined first time period, or reception of a stop instruction. For example, when the base station decides to allocate the dedicated uplink grant to the terminal, the terminal stops the first timer when receiving the allocated dedicated uplink grant. In case that the terminal has sent all useful data in the contention based transmission, or that the base station does not allocated the dedicated uplink grant to the terminal and the base station might only feedback acknowledgement information to the terminal although the transmission is successful, the terminal may stop the first timer. In case that the contention based transmission is unsuccessful or expiration of the time for the base station to feedback to the terminal, the first timer may be stopped after expiration of the predefined first time period. The first time period may be determined according to specific application in advance. Alternatively, the first timer may be stopped according to the stop instruction which may be sent by a user or other functional modules of the terminal. For example, the first timer is started and the terminal does not receive the dedicated uplink grant allocated by the base station, and the terminal intends to perform contention based transmission. At this time, the terminal may issue the stop instruction to stop the first timer.

By using the method according to the embodiment, the terminal is ensured to receive the feedback from the base station after performing the contention based transmission on the one hand, and the power is ensured to be saved on the other hand.

Second Embodiment

Figure 3:
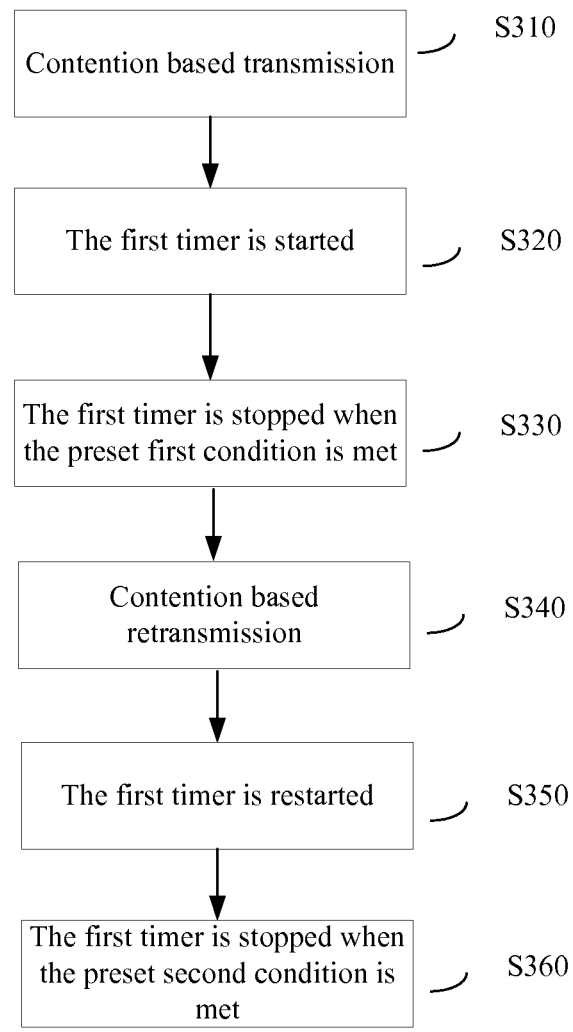
FIG. 3 illustrates a flow chart of a communication method in the discontinuous reception mode according to another embodiment of the present invention.

FIG. 3 illustrates a flow chart of a communication method in the discontinuous reception mode according to another embodiment of the present invention. As can be seen from the FIG. 3, the steps S310-S330 are the same as the steps S210-S230 of the first embodiment. After the preset first condition is met and the first timer is stopped accordingly, the terminal may determine whether a contention based retransmission needs to be performed if necessary. When the terminal determines that the contention based retransmission is needed, the terminal performs the contention based retransmission in step S340.

Since the terminal also should be kept active to wait for the feedback for the retransmission from the base station, the terminal restarts the first timer in step S350.

In step S360, the first timer is stopped when a preset second condition is met. It should be noted that the second condition also includes the terminal receiving a dedicated uplink grant allocated by the base station or the terminal receiving acknowledgement information sent by the base station, or expiration of a predefined first time period, or reception of a stop instruction. However, in fact, the second condition may be different from the first condition. For example, after contention based transmission for the first time, there might be the situation: the terminal failed to receive the feedback from the base station within the predefined first time period, such that the first condition is met and the first timer is stopped. For the above reason, the terminal performs retransmission, and receives the dedicated uplink grant allocated by the base station after the retransmission, such that the second condition is met and the first timer is stopped. That is, the first condition may be the same as or different from the second condition.

It should be noted that in the above embodiment, the retransmission is performed after the first timer is stopped. However, the present invention is not limited to this. If necessary, the retransmission may be performed before the first timer is stopped. In this case, the first timer is also restarted. This is easily to be conceived by those skilled in the art, and will not be described in detail herein. In this case, it can be considered that the first timer is stopped at first and then be restarted, and the condition which triggers the contention based retransmission is the first condition.

Third Embodiment

Figure 4:
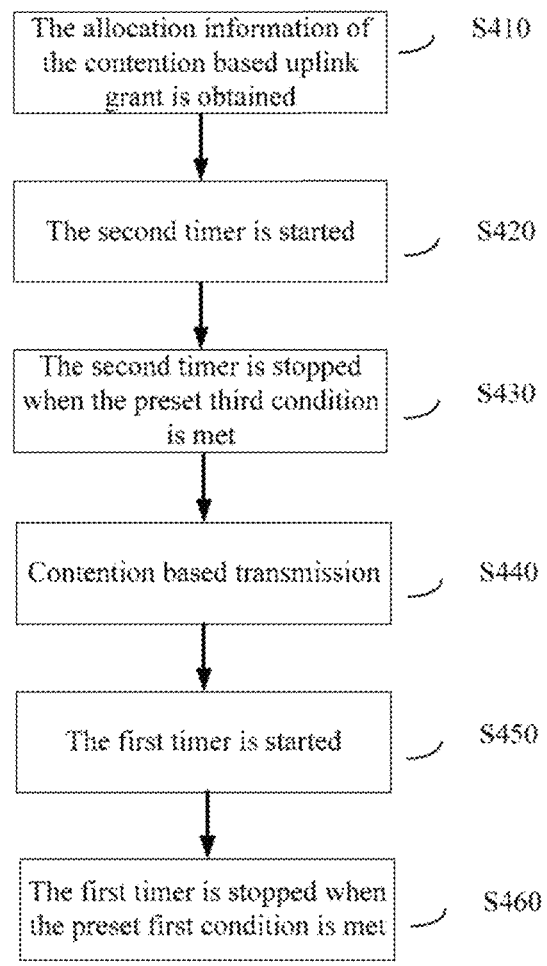
FIG. 4 illustrates a flow chart of a communication method in the discontinuous reception mode according to yet another embodiment of the present invention.

FIG. 4 illustrates a flow chart of a communication method in the discontinuous reception mode according to another embodiment of the present invention. As can be seen from the flow chart, before the step S440 of performing the contention based transmission by the terminal, the method further includes the following steps.

In step S410, the allocation information of a contention based uplink grant is obtained by the terminal, wherein the terminal may know in advance the time, when the base station allocates the contention based uplink grant. For example, the terminal may obtain the information about the time when the base station allocates the contention based uplink grant via a broadcast or a dedicated message sent by the base station, or the base station may map the cell radio network temporary identifier of the terminal into the time for receiving the contention based uplink grant, such that the terminal knows in advance the time when the terminal may receive the contention based uplink grant. If the terminal knows in advance the time, the terminal may decode the control channel of the base station during the time, so as to obtain the corresponding contention based uplink grant. Some times, however, the terminal can not know in advance the time when the base station allocates the contention based uplink grant. In this case, it is necessary for the terminal to perform blind decode on the control channel, until the contention based uplink grant sent to the terminal is decoded.

The terminal starts a second timer after obtaining allocation information of the contention based uplink grant, wherein the terminal is kept active during the operation of the second timer, and thus it is ensured that the terminal kept active before completing the contention based transmission.

In step S430, the second timer is stopped when a preset third condition is met. The third condition includes the terminal completing an uplink transmission in the contention based uplink grant, or expiration of a predefined second time period, or reception of a stop instruction. The stop instruction may be sent by a user or other functional modules of the terminal, for example.

In the flow chart, the following steps S440-S460 correspond to the steps S210-S230, and the description will be omitted herein.

As can be seen from the above discussion, not only the second timer is started after the allocation information of the contention based uplink grant is obtained such that the contention based transmission is ensured to be completed, but also the first timer is started after the contention based transmission is completed such that the corresponding feedback from the base station is ensured to be received.

It should be noted that FIG. 4 is a schematic flow chart, and the sequence of some steps might change in some cases. For example, after the second timer is started, when the contention based transmission is completed by the terminal, the third condition is met, and therefore, at this time, the second timer is stopped while the first timer is started. That is, the step S440 is performed before S430. It will be easily to be understood by those skilled in the art. In other words, it can be considered that the condition for triggering the contention based transmission is the third condition.

Similar to the situation described in the second embodiment, for example, in case that the contention based transmission for the first time is unsuccessful, the terminal may determine whether a contention based retransmission needs to be performed if necessary. When the terminal determines that the contention based retransmission is needed, the terminal performs the contention based retransmission. For this reason, it is necessary for the terminal to obtain the allocation information of contention based uplink grant again and restart the second timer. When the preset fourth condition is met, the second timer is stopped. Similar to the third condition, the fourth condition includes the terminal completing an uplink transmission in the contention based uplink grant, or expiration of a predefined second time period, or reception of a stop instruction. However, in fact, the fourth condition may be different from the third condition. For example, after obtaining the allocation information of the contention based transmission for the first time, there might be the situation: the terminal failed to complete the contention based transmission within the predefined second time period, such that the third condition is met and the second timer is stopped. For the above reason, the terminal obtains the allocation information of contention based uplink grant and completes the uplink transmission in the contention based uplink grant, such that the second condition is met and the second timer is stopped. That is, the third condition may be the same as or different from the fourth condition.

Figure 5:
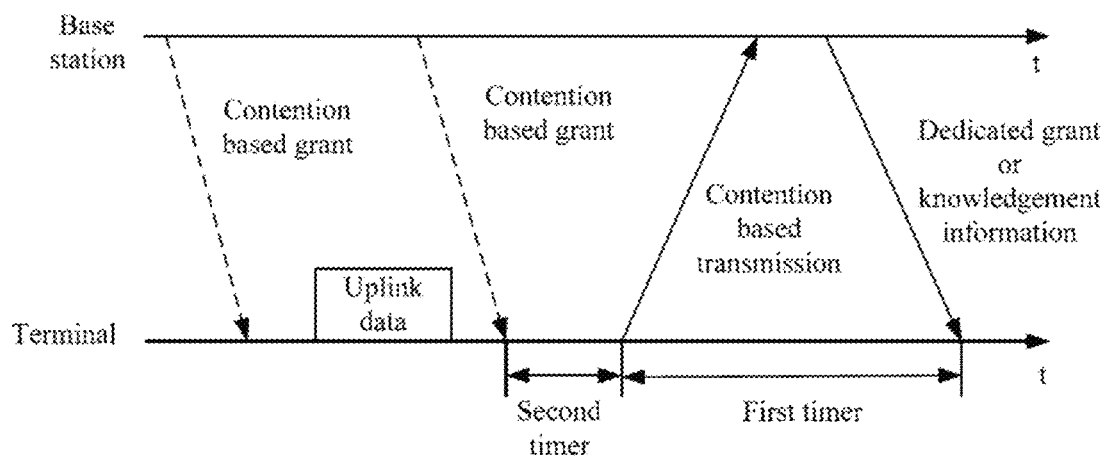
FIG. 5 illustrates a exemplified time chart of a communication method in the discontinuous reception mode according to the present invention.

For clarity, FIG. 5 illustrates a time chart of a communication method in the discontinuous reception mode according to the present invention. As can be seen from FIG. 5, if the terminal needs to send uplink data to the base station, the terminal obtains the allocation information of the contention based uplink grant and then starts the second timer. The second timer is stopped after the contention based transmission is completed, and then the first timer is started. The first timer will not be stopped until the dedicated uplink grant allocated by the base station or acknowledgement information is received. It will be easily to be understood for those skilled in the art that the FIG. 5 merely illustrates the time chart of a simple situation of the method according to the present invention, for understanding the present invention more clearly instead of limiting the present invention.

Fourth Embodiment

Figure 6:
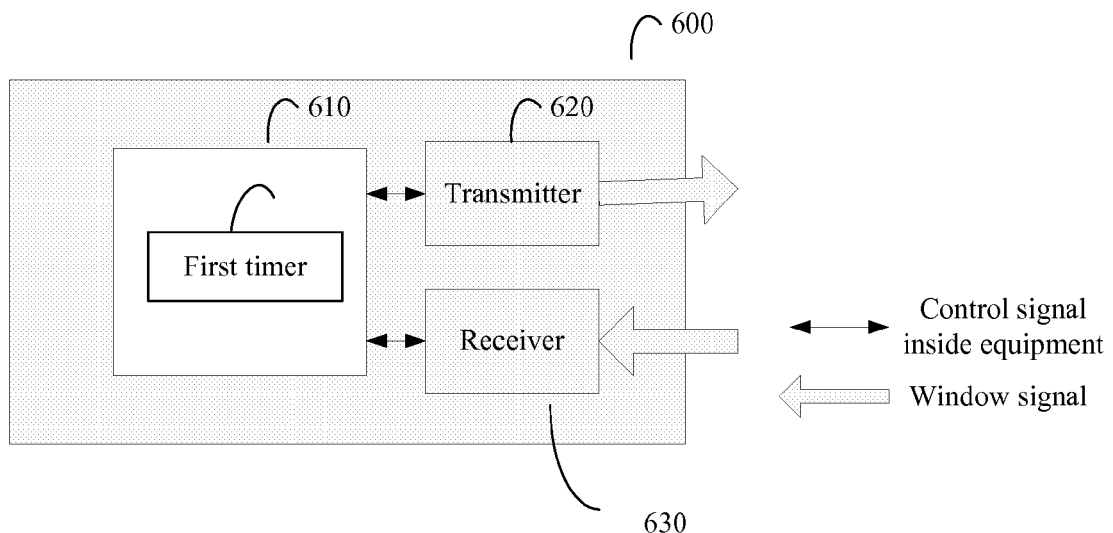
FIG. 6 illustrates a schematic view of the structure of a communication terminal having the discontinuous reception mode according to one embodiment of the present invention.

According to one embodiment of the present invention, there is proposed a communication terminal having a discontinuous reception mode. FIG. 6 illustrates a schematic view of the structure of a communication terminal having the discontinuous reception mode according to one embodiment of the present invention. As can be seen from FIG. 6, the communication terminal 600 includes a transmitter 620, a receiver 630 and a controller 610. The controller includes a first timer 611. The transmitter 620 is configured to perform a contention based transmission. The first timer 611 is configured to be started after the contention based transmission, and to be stopped when a preset first condition is met. The controller 610 is configured to keep the terminal 600 active during the operation of the first timer 611. The first condition includes the terminal 600 receiving a dedicated uplink grant allocated by a base station or the terminal 600 receiving acknowledgement information sent by the base station, or expiration of a predefined first time period, or reception of a stop instruction.

As described in the second embodiment, after the preset first condition is met and the first timer 611 is stopped accordingly, the terminal 600 may determine whether a contention based retransmission needs to be performed if necessary. As such, the transmitter 620 is further configured to perform a contention based retransmission when the terminal 600 determines that the contention based retransmission is needed. The first timer 611 may be further configured to be restarted after the retransmission, wherein the first timer 611 is stopped when a preset second condition is met. Please refer to the second embodiment for the detailed description of retransmission which will be omitted herein.

Fifth Embodiment

Figure 7:
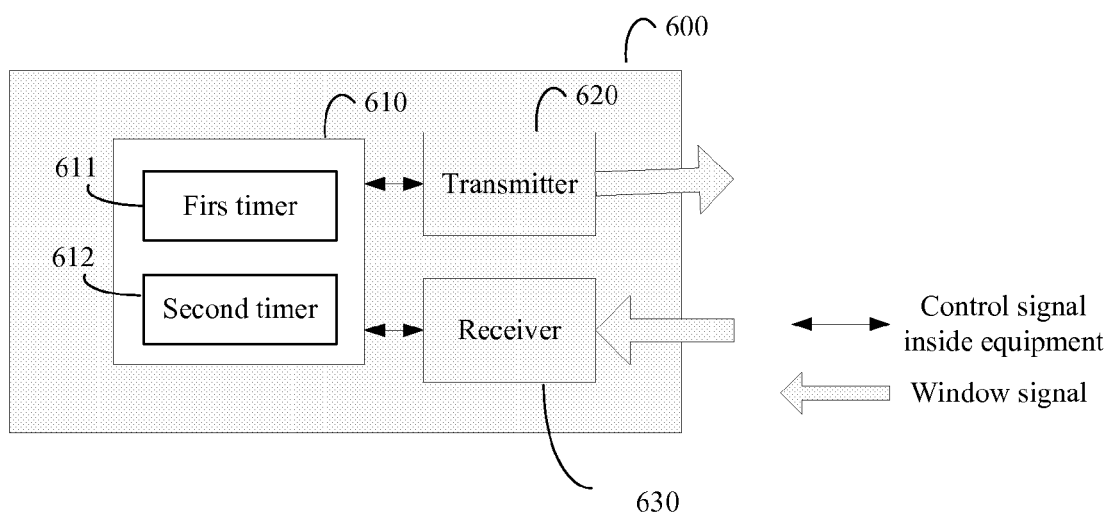
FIG. 7 illustrates a schematic view of the structure of a communication terminal having the discontinuous reception mode according to another embodiment of the present invention.

FIG. 7 is a schematic view of the structure of a communication terminal 600 having the discontinuous reception mode according to another embodiment of the present invention. As can be seen from FIG. 7, the difference between the present communication terminal and the communication terminal as illustrated in FIG. 6 lies in: the controller 610 includes a second timer 612 in addition to the first timer 611. The receiver 630 is configured to obtain allocation information of a contention based uplink grant. The second timer 612 is configured to be started after the allocation information is obtained by the receiver 630, and to be stopped when a preset third condition is met. The controller 610 is further configured to keep the terminal 600 active during the operation of the first timer 611 and the second timer 612. The third condition includes the terminal 600 completing an uplink transmission in the contention based uplink grant, or expiration of a predefined second time period, or reception of a stop instruction.

As described in the third embodiment, the terminal 600 may determine whether a contention based retransmission needs to be performed if necessary. The terminal 600 performs the contention based retransmission when the terminal determines that the contention based retransmission is needed. As such, the receiver 630 is further configured to obtain allocation information of the contention based uplink grant again when the terminal 600 determines that the contention based retransmission is needed. The second timer 612 is further configured to be restarted when the receiver 630 obtains the allocation information again. The second timer is stopped when a preset fourth condition is met.

Similar to the case described in the third embodiment, the terminal 600 may know in advance the time when the base station allocates the contention based uplink grant. For example, the terminal may obtain the information about the time when the base station allocates the contention based uplink grant via a broadcast or a dedicated message sent by the base station, or the base station may map the cell radio network temporary identifier of the terminal to the time for receiving the contention based uplink grant, such that the terminal 600 knows the time when the terminal can receive the contention based uplink grant. When the terminal 600 knows in advance the time, the terminal 600 may decode the control channel of the base station during the time. Some time, however, the terminal can not know in advance the time when the base station allocates the contention based uplink grant. In this case, the terminal 600 perform blind decode on the control channel, so as to obtain the contention based uplink grant sent to the terminal.

Finally, the terms "include", "comprise", "contain" or any other variation is intended to cover the non-exclusive inclusion, so that a process, method, article or device that includes a series of elements include not only those elements but also other elements not explicitly listed, or further include inherent elements of such process, method, article or device. In addition, in the case of no more limitations, an element defined by the sentence "comprise a" does not exclude the presence of other same elements in the process, method, article or device that includes an element.

Although the embodiments of the present invention have been described in conjunction with the accompanying drawings, it should be understood that the embodiments described above are only for the purpose of illustrating the present invention, but not to limit the present invention. Various modifications and variations can be made by those skilled in the art without departing from the substance and scope of the present invention. Therefore, the scope of the present invention is only defined by the appended claims and their equivalents.

What is claimed is:

1. A communication method in a discontinuous reception mode of a mobile communication system, comprising:
    obtaining, by a terminal, allocation information of a contention based uplink grant, wherein the terminal knows in advance a time when a base station allocates the contention based uplink grant;
    starting a second timer, wherein the terminal is kept active during the operation of the second timer;
    stopping the second timer when a preset third condition is met;
    performing, by the terminal, a contention based transmission in which the terminal performs uplink transmission by using a resource that is allocated via the contention based uplink grant in a manner of contention without transmitting a scheduling request in advance;
    starting a first timer after the contention based transmission, wherein the terminal is kept active during operation of the first timer; and
    stopping the first timer when a preset first condition is met.

2. The communication method according to claim 1, wherein the first condition comprises: the terminal receiving a dedicated uplink grant allocated by the base station or the terminal receiving acknowledgement information sent by the base station, or expiration of a predefined first time period, or reception of a stop instruction.

3. The communication method according to claim 1, further comprising:
    determining, by the terminal, whether a contention based retransmission needs to be performed;
    performing the contention based retransmission by the terminal when the terminal determines that the contention based retransmission is needed;
    restarting the first timer; and
    stopping the first timer when a preset second condition is met.

4. The communication method according to claim 1, wherein the third condition comprises: the terminal completing an uplink transmission in the contention based uplink grant, or expiration of a predefined second time period, or reception of a stop instruction.

5. The communication method according to claim 1, further comprising:
   determining, by the terminal, whether a contention based retransmission needs to be performed;
   obtaining, by the terminal, allocation information of the contention based uplink grant again when the terminal determines that the contention based retransmission is needed;
   restarting the second timer; and
   stopping the second timer when a preset fourth condition is met.

6. The communication method according to claim 1, wherein in the step of obtaining, by the terminal, allocation information of a contention based uplink grant, the terminal obtains the information about the time when the base station allocates the contention based uplink grant via a broadcast or a dedicated message sent by the base station.

7. The communication method according to claim 1, wherein in the step of obtaining, by the terminal, allocation information of a contention based uplink grant, the information about the time when the base station allocates the contention based uplink grant is obtained by mapping a cell radio network temporary identifier of the terminal to the time for receiving the contention based uplink grant.

8. The communication method according to claim 1, wherein the terminal performs a blind decoding on the allocation of the base station, so as to obtain the allocation information of the contention based uplink grant.

9. A communication terminal having a discontinuous reception mode, comprising a transmitter, a receiver and a controller, the controller comprises a first timer and a second timer, wherein
   the receiver is configured to obtain allocation information of a contention based uplink grant;
   the transmitter is configured to perform a contention based transmission in which the terminal performs uplink transmission by using a resource that is allocated via the contention based uplink grant in a manner of contention without transmitting a scheduling request in advance;
   the first timer is configured to be started after the contention based transmission, and to be stopped when a preset first condition is met; the second timer is configured to be started after the allocation information is obtained by the receiver, and to be stopped when a preset third condition is met; and
   the controller is configured to keep the terminal active during the operation of the first timer and to keep the terminal active during the operation of the second timer, wherein when the terminal obtains the allocation information of the contention based uplink grant, the terminal knows in advance a time when a base station allocates the contention based uplink grant.

10. The communication terminal according to claim 9, wherein the first condition comprises: the terminal receiving a dedicated uplink grant allocated by the base station or the terminal receiving acknowledgement information sent by the base station, or expiration of a predefined first time period, or reception of a stop instruction.

11. The communication terminal according to claim 9, wherein
   the transmitter is further configured to perform a contention based retransmission when the terminal determines that the contention based retransmission is needed;
   the first timer is further configured to be restarted after the retransmission; wherein the first timer is stopped when a preset second condition is met.

12. The communication terminal according to claim 9, wherein the third condition comprises: the terminal completing an uplink transmission in the contention based uplink grant, or expiration of a predefined second time period, or reception of a stop instruction.

13. The communication terminal according to claim 9, wherein:
   the receiver is further configured to obtain allocation information of the contention based uplink grant again when the terminal determines that the contention based retransmission is needed;
   the second timer is further configured to be restarted when the allocation information is obtained by the receiver again;
   wherein the second timer is stopped when a preset fourth condition is met.

14. The communication terminal according to claim 9, wherein when the terminal obtains the allocation information of the contention based uplink grant, the terminal obtains the information about the time when the base station allocates the contention based uplink grant via a broadcast or a dedicated message sent by the base station.

15. The communication terminal according to claim 9, wherein when the terminal obtains the allocation information of the contention based uplink grant, the information about the time when the base station allocates the contention based uplink grant is obtained by mapping a cell radio network temporary identifier of the terminal to the time for receiving the contention based uplink grant.

16. The communication terminal according to claim 9, wherein the terminal performs a blind decoding on the allocation of the base station, so as to obtain the allocation information of the contention based uplink grant.

* * * * *